(12) United States Patent
Kondoh et al.

(10) Patent No.: US 8,842,109 B2
(45) Date of Patent: Sep. 23, 2014

(54) IMAGE DISPLAY DEVICE AND IMAGE DISPLAY METHOD

(75) Inventors: Naoko Kondoh, Osaka (JP); Toshiyuki Gotoh, Osaka (JP); Yasushi Tetsuka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 344 days.

(21) Appl. No.: 13/145,079

(22) PCT Filed: Jan. 16, 2010

(86) PCT No.: PCT/JP2010/050445
§ 371 (c)(1),
(2), (4) Date: Jul. 18, 2011

(87) PCT Pub. No.: WO2010/082641
PCT Pub. Date: Jul. 22, 2010

(65) Prior Publication Data
US 2011/0285681 A1    Nov. 24, 2011

(30) Foreign Application Priority Data

Jan. 19, 2009    (JP) ................. 2009-009006

(51) Int. Cl.
G09G 5/00    (2006.01)
G09G 5/02    (2006.01)
H04N 9/31    (2006.01)
G09G 3/34    (2006.01)
H04N 5/58    (2006.01)
G02F 1/1335    (2006.01)
G09G 5/14    (2006.01)

(52) U.S. Cl.
CPC .......... H04N 5/58 (2013.01); *G09G 2320/0242* (2013.01); G09G 5/02 (2013.01); *G02F 1/133621* (2013.01); H04N 9/3155 (2013.01); *G09G 3/3426* (2013.01); *G09G 2320/0233* (2013.01); *G09G 3/3413* (2013.01); *G09G 5/14* (2013.01); *G09G 2320/0646* (2013.01); *G02F 2001/133601* (2013.01); *G02F 1/133603* (2013.01)
USPC ........................... 345/207; 345/690; 345/204

(58) Field of Classification Search
CPC . G09G 5/02; G09G 5/026; G09G 2320/0233; G09G 2320/0666; G09G 2320/0673; G09G 2320/0646
USPC .................................................. 345/207, 690
See application file for complete search history.

(56) References Cited

U.S. PATENT DOCUMENTS 6,960,484 B2    11/2005    Yoo et al.
7,039,109 B2    5/2006    Pelagotti et al.
(Continued)

FOREIGN PATENT DOCUMENTS

EP    1 914 713 A1    4/2008
EP    1 939 850 A1    7/2008
(Continued)

OTHER PUBLICATIONS

Machine translation of JP2007-322944.*
(Continued)

*Primary Examiner* — Lixi C Simpson
(74) *Attorney, Agent, or Firm* — Birch, Stewart, Kolasch & Birch, LLP

(57) ABSTRACT

The occurrence of the halo phenomenon caused in a display panel unit is detected in a liquid crystal display device that displays an image in the display panel unit including color filters of a plurality of colors by respectively controlling emission ratios of a plurality of LEDs emitting lights of colors respectively corresponding to the plurality of color filters. Upon detection, a part of the display panel unit, for example, the channel number and the vicinity thereof are set as a non-detection area in which the detection of the halo phenomenon is restricted and the remaining area is set as a detection area. The chroma of light, which corresponds to mixed light from the plurality of LEDs, is reduced by controlling the emission ratios of the LEDs on the basis of the detection result in the detection area, so that the color of light is closer to white.

19 Claims, 14 Drawing Sheets

(56) References Cited

U.S. PATENT DOCUMENTS

| | | | |
|---|---|---|---|
| 8,232,956 B2* | 7/2012 | Fujine et al. | 345/102 |
| 2005/0231457 A1 | 10/2005 | Yamamoto et al. | |
| 2006/0262078 A1 | 11/2006 | Inuzuka et al. | |
| 2008/0150433 A1 | 6/2008 | Tsuchida et al. | |
| 2008/0150880 A1 | 6/2008 | Inuzuka et al. | |
| 2009/0146941 A1 | 6/2009 | Fujine et al. | |
| 2010/0231603 A1* | 9/2010 | Kang | 345/591 |
| 2011/0205256 A1* | 8/2011 | Park et al. | 345/690 |
| 2012/0113152 A1 | 5/2012 | Chevallier et al. | |

FOREIGN PATENT DOCUMENTS

| | | | |
|---|---|---|---|
| EP | 2 333 765 A1 | 6/2011 | |
| JP | 2001-142409 A | 5/2001 | |
| JP | 2004-85961 A | 3/2004 | |
| JP | 2005-258404 A | 9/2005 | |
| JP | 2005-338857 A | 12/2005 | |
| JP | 2007-140483 A | 6/2007 | |
| JP | 2007-322944 A | 12/2007 | |
| JP | 2008-51905 A | 3/2008 | |
| JP | 2008-102379 A | 5/2008 | |
| JP | 2008-159550 A | 7/2008 | |
| RU | 2298226 C1 | 4/2007 | |
| WO | WO 2007046319 A1 * | 4/2007 | |
| WO | WO 2008/096468 A1 | 8/2008 | |
| WO | WO 2008/099338 A1 | 8/2008 | |
| WO | WO 2008/155265 A1 | 12/2008 | |

OTHER PUBLICATIONS

Extended European Search Report issued in European Patent Application No. 10731310.8 mailed Aug. 12, 2012.

Hendriek Groot Hulze et al. "51.3: Driving an Adaptive Local Dimming Backlight for LCD-TV Systems", SID 2008, 2008 SID International Symposium, Society for Information Display, Los Angeles, USA, vol. XXXIX, May 18, 2008, pp. 772-775, XP007016627, ISSN: 0008-966X Paragraph [0006].

* cited by examiner

F I G. 8
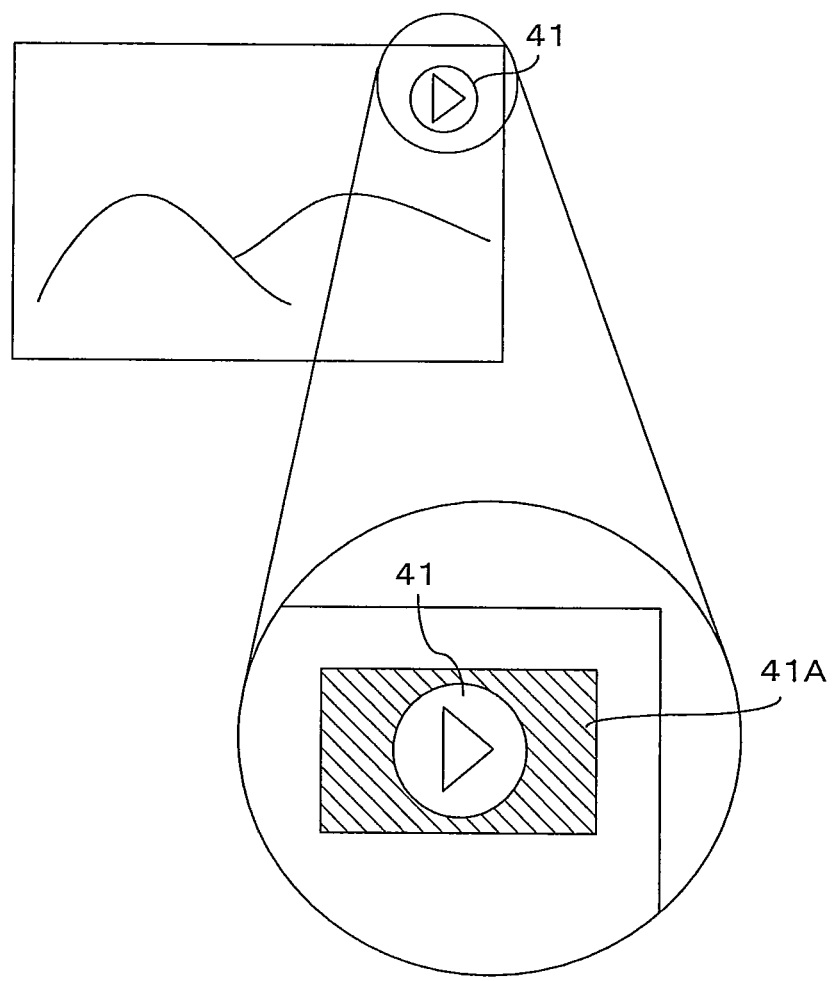

F I G. 1 1 A
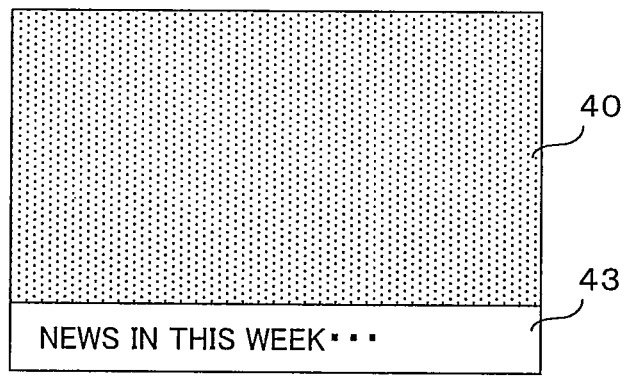
F I G. 1 1 B
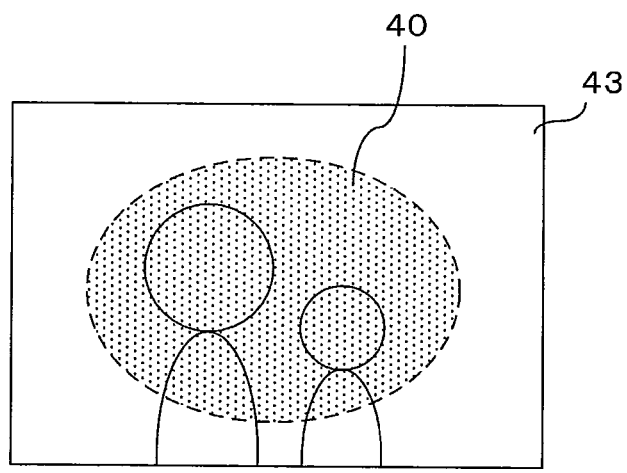

IMAGE DISPLAY DEVICE AND IMAGE DISPLAY METHOD

This application is the national phase under 35 U.S.C. §371 of PCT International Application No. PCT/JP2010/050445 which has an International filing date of Jan. 16, 2010 and designated the United States of America.

BACKGROUND

1. Technical Field

The present invention relates to an image display device and an image display method in which an image is displayed by driving a light source so as to reduce uneven luminance or uneven color.

2. Description of Related Art

A liquid crystal display device displays an image by allowing a liquid crystal panel to transmit or block light emitted from a backlight. The color reproducibility, the contrast performance and the power consumption of the liquid crystal display device mainly depend upon the performance or control of the liquid crystal panel and the backlight. Recently, a driving method in which a backlight is divided into a plurality of areas for controlling an emission ratio in each area (hereinafter referred to as the area active drive) has been proposed.

In the area active drive, when a part of an image to be displayed has low luminance, the emission ratio of an area of the backlight corresponding to this part is lowered so as to set the transmittance of the liquid crystal panel in accordance with the emission ratio. Since the emission ratio of each area of the backlight may be thus optimized, the power consumption of the backlight as a whole may be reduced. Furthermore, since the emission ratio is lowered in every area, a black floating in liquid crystal display (for example, a state where a black portion on a screen is displayed slightly bright when the lighting is off) may be reduced, and in addition, the contrast and the image quality may be improved.

In this area active drive, an RGB-LED light source including LEDs (light emitting diodes) of three colors of red (R), green (G) and blue (B) may be used as the backlight. In this case, it is necessary not only to increase/decrease the emission ratio of every area but also to control each of the three color LEDs in the area. Specifically, when a displayed image corresponding to a given area is in blue alone, the red (R) LED (hereinafter referred to as the R-LED) and the green (G) LED (hereinafter referred to as the G-LED) are placed in an off state and the blue (B) LED (hereinafter referred to as the B-LED) alone is placed in an on state in this area, and the transmittance of the liquid crystal display panel is set in accordance with the emission ratio of the B-LED. Thus, an image with a high color purity of blue alone may be displayed. Since a necessary LED alone out of all the LEDs present in every area is controlled in this manner, the effect to reduce the power consumption may be highly attained as compared with the case where a white light source is used. Furthermore, since the color purity of each primary color is increased, the color gamut of a displayed image may be increased.

With respect to the aforementioned area active drive, Japanese Patent Application Laid-Open No. 2005-338857 describes a device and a method in which a backlight may be locally controlled in luminance and color characteristics. In the device and the method described in Japanese Patent Application Laid-Open No. 2005-338857, a liquid crystal display panel is divided into a plurality of areas, and the backlight includes a plurality of LEDs for emitting light to the respective areas. The emission ratio of each LED is controlled in accordance with a peak value of the gradation values of each area of the liquid crystal panel.

SUMMARY

In the area active drive using an RGB-LED light source, there may occur a trouble depending upon the characteristic of a color filter used in the liquid crystal panel. FIG. 13 is a schematic diagram illustrating the relationship between the transmittance characteristics of color filters of a liquid crystal panel and the wavelengths of respective RGB LEDs. The characteristic of, for example, a blue (B) color filter (hereinafter referred to as the B-CF) partly overlaps the wavelength of the G-LED. Therefore, even in the case where light of the B-LED alone is desired to be allowed to pass through the B-CF, light of the G-LED passes through the B-CF, and hence, light leakage of the unwanted LED occurs. When the emission ratios of the respective LEDs are fixed to be the same, a proportion in the quantity of light passing through the B-CF between the light from the B-LED and the light from the G-LED is always constant, and therefore, the light leakage may be avoided by limiting the quantity of the light from the G-LED leaked through the B-CF at the stage of design.

When the emission ratio of each LED is dynamically changed, however, the quantity of light leakage is also dynamically changed. FIG. 14 is a schematic diagram explaining light leakage caused when emission ratios are changed. In a screen illustrated in FIG. 14, a green rectangular image 101 is displayed in a blue background image 100. Also, the screen is divided into a plurality of areas including an area A and an area B, and the rectangular image 101 is displayed in the area A and has a size smaller than the area A. Furthermore, a backlight is also divided correspondingly to the respective areas of the screen so as to be controlled in the light emission in each area.

In this case, in the area B, since the blue background image 100 alone is displayed, light is emitted from the B-LED alone. Therefore, light emitted from the LEDs other than the B-LED never passes through the B-CF in the area B, and hence, no light leakage occurs and the image is displayed in blue with a high color purity. On the other hand, in the area A, since both the blue background image 100 and the green rectangular image 101 are displayed, light is emitted from both the B-LED and the G-LED. Therefore, the light emitted from the G-LED passes through the B-CF, and hence, light leakage occurs in the area A. When the quantity of this light leakage is large, the blue image is displayed with luminance much higher than the original luminance.

Accordingly, in the screen, a phenomenon that blue is displayed more brightly (i.e., a phenomenon that a halo is dimly seen around the displayed image; hereinafter referred to as the halo phenomenon) occurs in and around a border 102 on the outline of the rectangular image 101 due to the leakage of the green light, which spoils the quality of the image. On the other hand, when the halo phenomenon occurs in such a position as not to bother a viewer like an edge portion of the screen or when the halo phenomenon disappears in a short period of time, the original color purity of an image is spoiled if the light emission from the respective LEDs is controlled, and it is apprehended that the resultant image may rather make a viewer feel uncomfortable.

The present invention has been made with the aim of solving the above problems, and it is an object of the present invention to provide an image display device and an image display method capable of reducing a fear of degradation of the original image quality otherwise caused by excessively suppressing uneven luminance or uneven color.

An image display device according to the present invention is an image display device for displaying an image in a display unit including color filters of a plurality of colors by respectively controlling emission ratios of a plurality of light sources emitting light of colors respectively corresponding to the color filters, and characterized by comprising: detecting means for detecting uneven luminance or uneven color caused in the display unit due to a light leakage from the light source other than the light source corresponding to the color filter; detection restricting means for restricting detection performed by the detecting means in a part of the display unit; and control means for controlling the emission ratios of the light sources on the basis of a detection result obtained by the detecting means and for making color of the light to be closer to white by lowering chroma of the light, wherein the light corresponds to mixed light from the plurality of light sources and to be made incident upon the color filters.

The image display device according to the present invention is characterized in that the control means controls the emission ratios of the light sources for making color of the light from the light sources to be closer to white by lowering the chroma of the light by additive color mixture.

The image display device according to the present invention is characterized in that the detection restricting means comprises type obtaining means for obtaining a type of an image to be displayed in the display unit; and setting means for setting an arbitrary area in the display unit on the basis of the type obtained by the type obtaining means, and detection performed by the detecting means is restricted in the area set by the setting means.

The image display device according to the present invention is characterized in that the detecting means detects uneven luminance or uneven color occurring in a part of the display unit, and the control means controls the emission ratios of the light sources disposed in a position corresponding to the part detected by the detecting means.

The image display device according to the present invention is characterized by further comprising display control means for displaying an OSD image in the display unit, and the detection restricting means restricts detection on the basis of the OSD image displayed by the display control means.

The image display device according to the present invention is characterized in that the detection restricting means restricts detection in a position corresponding to the OSD image displayed by the display control means in the display unit.

The image display device according to the present invention is characterized by further comprising receiving means for receiving a signal from external device, and the display control means displays the OSD image on the basis of the signal received by the receiving means.

An image display method according to the present invention is an image display method for displaying an image in a display unit including color filters of a plurality of colors by respectively controlling emission ratios of a plurality of light sources emitting light of colors respectively corresponding to the plurality of color filters, characterized by comprising the steps of: detecting uneven luminance or uneven color caused in the display unit due to a light leakage from the light source other than the light source corresponding to the color filter with the detection restricted in a part of the display unit; and controlling the emission ratios of the light sources on the basis of a result of detection of the uneven luminance or uneven color and making color of the light to be closer to white by lowering chroma of the light, wherein the light corresponds to mixed light from the plurality of light sources and to be made incident upon the color filters.

According to the present invention, in detecting uneven luminance or uneven color, the detection is restricted in a part of the display unit, the emission ratios of light sources are controlled on the basis of the result of the detection, and the chroma of mixed light of light emitted from the plurality of light sources and to be made incident upon the color filters is lowered, so as to make color of the mixed light to be closer to white. When the mixed light is made to be closer to white light, the display unit lowers the transmittance for retaining a displayed color. As a result, it is possible to reduce a fear of spoiling the quality of an image to be displayed in the display unit due to the uneven luminance or uneven color otherwise caused by transmission of unnecessary light from the light sources. Furthermore, since the detection is restricted in a part of the display unit, even when the uneven luminance or uneven color is caused, the emission ratios of the light sources are not controlled for reducing the unevenness in this part. Therefore, when the uneven luminance or uneven color occurs, for example, in a position not bothering a viewer, the process of reducing the unevenness is not performed, so as to avoid degradation of the image quality otherwise caused by preferentially suppressing the uneven luminance or uneven color. Accordingly, the original image quality may be retained.

At this point, the light source other than a light source corresponding to the color filter means the light sources other than one having an emission wavelength according with a color filter of the corresponding color. Assuming that, for example, color filters of three colors of red (R), green (G) and blue (B) are used, a light source corresponding to the R (red) color filter is a red light source, and light sources respectively corresponding to the G (green) and B (blue) color filters are green and blue light sources, respectively. Accordingly, with respect to the R (red) color filter, light sources other than the light source corresponding to the color filter are the green and blue light sources. Similarly, with respect to the G (green) color filter, they are the red and blue light sources, and with respect to the B (blue) color filter, they are the red and green light sources.

According to the present invention, the light sources of three colors of red, green and blue are used for obtaining white light by mixing the light of the respective colors.

According to the present invention, the detection of the uneven luminance or uneven color is restricted in an area set in the display unit on the basis of the type of an image to be displayed. Since the uneven luminance or uneven color may be ignored depending upon the type of an image, it is possible to reduce a fear of degradation of the image quality otherwise caused by excessive control of the emission ratios of the light sources.

According to the present invention, the emission ratio of a light source disposed in a position corresponding to a part of the display unit where the uneven luminance or uneven color is to be detected is controlled. Therefore, when uneven luminance or the like is not caused in a detection area of the display unit, there is no need to control the emission ratios of the light sources corresponding to this area, and thus, the power consumption of the light sources may be reduced. Furthermore, also when the detection is restricted, there is no need to control the emission ratios of the light sources corresponding to this area, and hence, the power consumption of the light sources may be similarly reduced.

According to the present invention, the detection of the uneven luminance or uneven color is restricted in accordance with information on an OSD image, such as the display position, the size and the content of an OSD image. The OSD image is displayed in an edge portion of the screen and disappears in a short period of time in some cases, and hence, there is sometimes no need to perform the control for reducing the uneven luminance or uneven color derived from the OSD image. Therefore, even when the uneven luminance or uneven color is caused due to an OSD image, the detection is restricted so as not to perform the control of the emission ratios, and thus, the quality of another image may be prevented from being degraded through excessive control of the emission ratios.

According to the present invention, the detection of the uneven luminance or uneven color caused in a position where an OSD image is displayed is restricted. When there is no need to reduce the uneven luminance or uneven color caused due to an OSD image displayed in an edge portion of the screen, the quality of another image may be prevented from being degraded through excessive control of the emission ratios.

According to the present invention, since information on an OSD image is obtained from external device, even when an image is to be displayed in the image display device by operating the external device such as a reproducing device, it is similarly possible to avoid a fear of degradation of the image quality otherwise caused by preferentially suppressing the uneven luminance or uneven color.

According to the present invention, in detecting the uneven luminance or uneven color, the detection is restricted in a part of the display unit, and the emission ratios of a plurality of light sources are controlled, on the basis of a detection result, so as to make color of the mixed light, to be made incident upon the color filters, to be closer to white. When the mixed light is made to be closer to white light, the display unit lowers the transmittance for retaining a displayed color. As a result, it is possible to reduce a fear of spoiling the quality of an image to be displayed in the display unit due to the uneven luminance or uneven color otherwise caused by transmission of unnecessary light from the light sources. Furthermore, since the detection is restricted in a part of the display unit, even when the uneven luminance or uneven color is caused, the emission ratio of the light source is not controlled for reducing the unevenness. Therefore, when the uneven luminance or uneven color occurs, for example, in a position not bothering a viewer, the process of reducing the unevenness is not performed, so as to avoid degradation of the image quality otherwise caused by preferentially suppressing the uneven luminance or uneven color. Accordingly, the original image quality may be retained.

The above and further objects and features will more fully be apparent from the following detailed description with accompanying drawings.

BRIEF DESCRIPTION OF THE SEVERAL VIEWS OF THE DRAWINGS

FIG. 8 is a schematic diagram explaining a detection area to be set in displaying an OSD image;

FIG. 11A is a schematic diagram illustrating first and second detection areas set on the basis of genre information;

FIG. 11B is a schematic diagram illustrating first and second detection areas set on the basis of genre information;

DETAILED DESCRIPTION

The following will describe in detail an image display device according to the present invention with reference to the drawings illustrating some embodiments thereof. A liquid crystal display device according to each embodiment corresponds to an image display device of the present invention, which displays an image on the basis of externally input RGB video signals. The RGB video signals may be received through television waves, read from a recoding medium such as a DVD (digital versatile disc) or input through a network.

Embodiment 1

Figure 1:
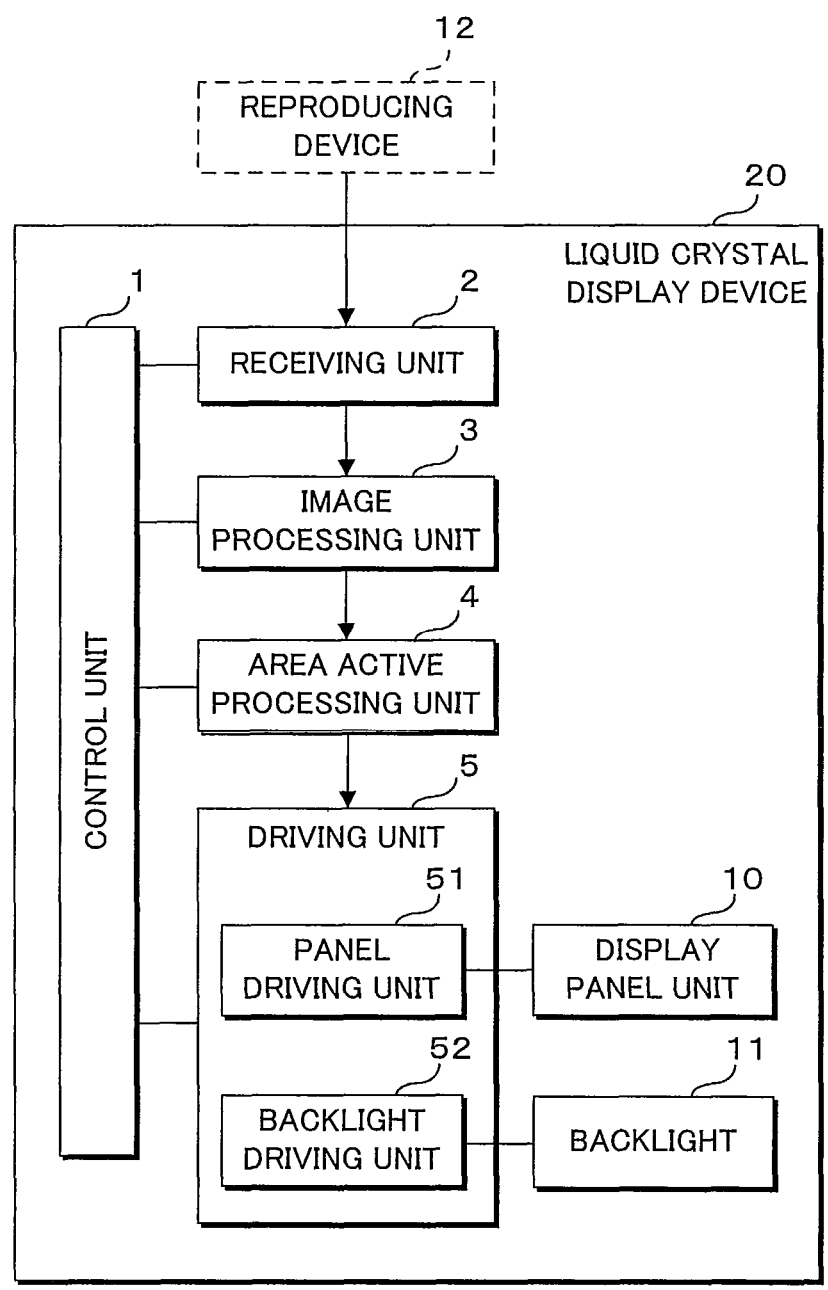
FIG. 1 is a block diagram illustrating the structure of a liquid crystal display device according to this embodiment.

FIG. 1 is a block diagram illustrating the structure of a liquid crystal display device according to this embodiment.

The liquid crystal display device 20 includes a control unit 1, a receiving unit 2, an image processing unit 3, an area active processing unit 4 and a driving unit 5 for driving a display panel unit 10 and a backlight 11. The display panel unit 10 includes the backlight 11 on its rear face side and includes a display unit for displaying an image on the basis of an RGB video signal on its front face side. The display panel unit 10 includes display elements having pixels in number according to the resolution of its display screen. The display elements include a color filter for allowing necessary light (of a necessary wavelength) to pass therethrough and blocking the other light (of the other wavelength), and transmits light of one of three colors of red (R), green (G) and blue (B). A color image is displayed on the display screen by light passing through the display elements. It is noted that the quantity of light passing through the display elements is determined depending upon the transmittance of the display elements. The transmittance means a ratio of light that the display elements may transmit out of the whole light emitted from the backlight 11.

Figure 2:
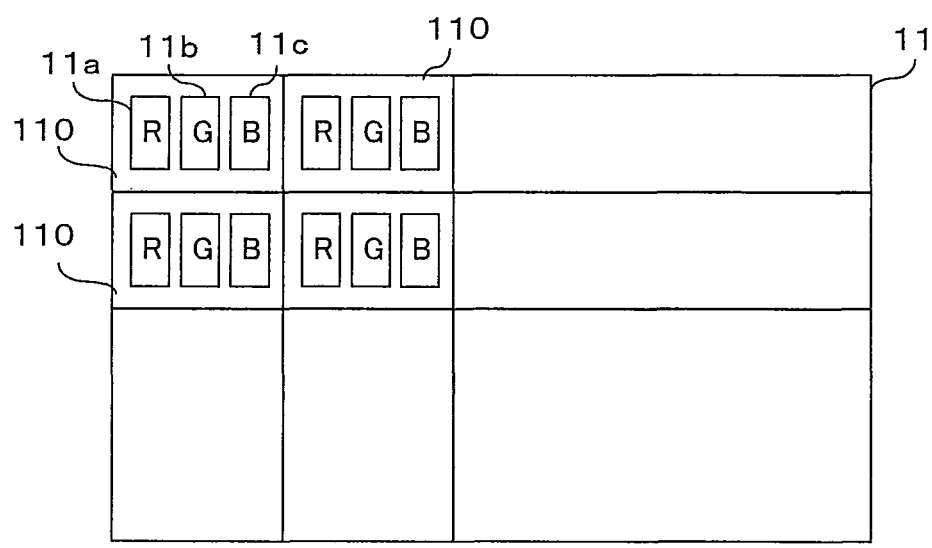
FIG. 2 is a schematic diagram illustrating the structure of a backlight.
Figure 3A:
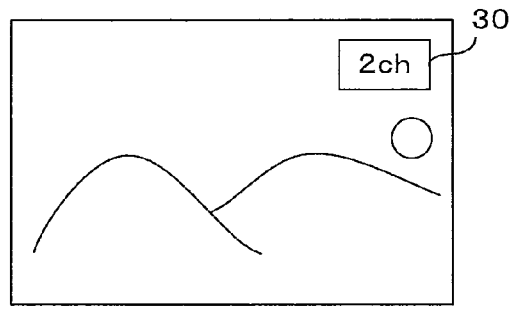
FIG. 3A is a diagram illustrating an example of an OSD image.
Figure 3B:
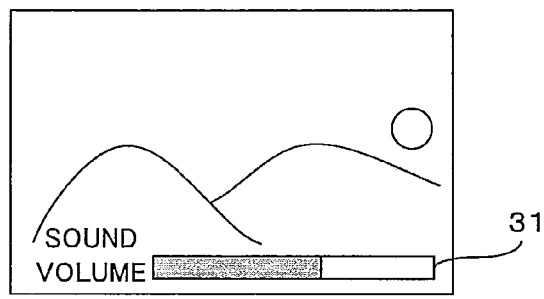
FIG. 3B is a diagram illustrating another example of the OSD image.
Figure 3C:
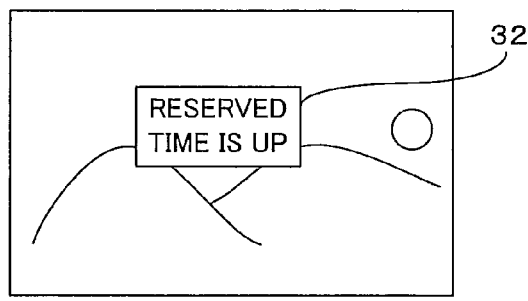
FIG. 3C is a diagram illustrating another example of the OSD image.
Figure 3D:
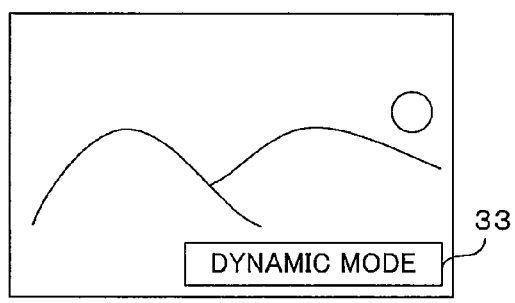
FIG. 3D is a diagram illustrating another example of the OSD image.

The backlight 11 is a light source for emitting light from the rear side of the display panel unit 10. FIG. 2 is a schematic diagram illustrating the structure of the backlight 11. The backlight 11 is wholly divided into a plurality of rectangular areas 110, each of which includes an R-LED 11a, a G-LED 11b and a B-LED 11c. The backlight 11 is controlled for light emission with respect to each of the areas 110. Incidentally, in FIG. 2, although each area 110 includes the LEDs 11a, 11b and 11c one each, a plurality of LEDs of each color may be provided in each area. For example, in the case where a large quantity of light is necessary, two or more LEDs of each color may be provided in every area.

The receiving unit 2 receives an RGB video signal read by a reproducing device 12 from a recording medium of a DVD or the like. It is noted that the receiving unit 2 may receive television waves or receive data transmitted through a WAN (wide area network) or the like.

The image processing unit 3 performs various signal process on the RGB video signal received by the receiving unit 2. For example, the image processing unit 3 obtains image data extracted from the RGB video signal at constant time intervals (hereinafter referred to as a frame), obtains the gradation values of the image data, adjusts the size or the like of the image data and outputs various obtained information to the control unit 1 and the area active processing unit 4. Furthermore, the image processing unit 3 appropriately executes various signal process such as process of generating an RGB signal, digital conversion process, color space conversion process, scaling process, color correction process, synchronization detecting process, gamma correction process, and OSD (on-screen display) process.

The OSD means display of an OSD image in the display panel unit 10. FIGS. 3A to 3D, 4A and 4B are diagrams illustrating examples of the OSD image. FIGS. 3A to 3D illustrate OSD images displayed in operating a remote controller (hereinafter simply referred to as the controller) of the liquid crystal display device 20, and specifically, a channel is displayed in FIG. 3A, a sound volume is displayed in FIG. 3B, information is displayed in FIG. 3C and an image quality mode is displayed in FIG. 3D. As the display of a channel, a channel number 30 of a currently viewed channel is displayed. As the display of a sound volume, a volume bar 31 is displayed when a viewer adjusts the sound volume with the controller or the like. As the display of information, an information screen 32 for informing the state of the liquid crystal display device 20, the timer setting for viewing a program, the start of download of information, or warning is displayed at the center of the screen. As the display of an image quality mode, a mode informing image 33 is displayed when a viewer changes the image quality with the controller or the like. The image quality mode includes a dynamic mode, a standard mode and a movie mode, and the luminance, the contrast and the like of an image are set to prescribed values in each mode.

Figure 4A:
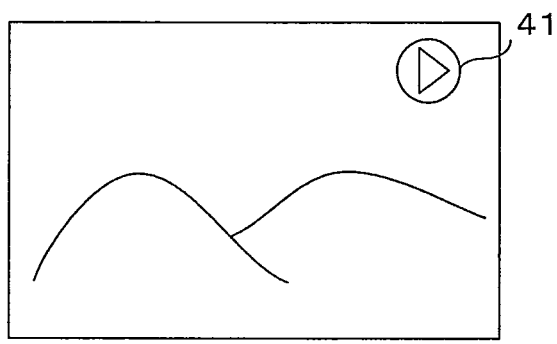
FIG. 4A is a diagram illustrating another example of the OSD image.
Figure 4B:
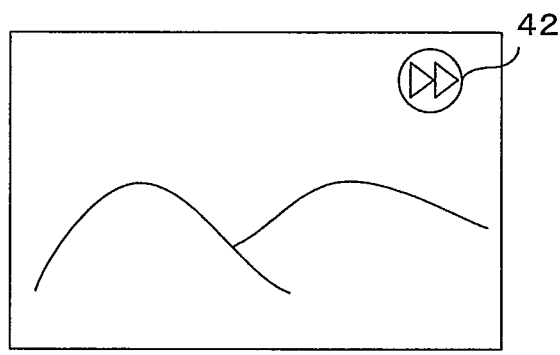
FIG. 4B is a diagram illustrating another example of the OSD image.

FIGS. 4A and 4B illustrate OSD images displayed in operating the reproducing device 12, that is, the external device, and for example, a reproducing mode is displayed in FIG. 4A and a fast-forward mode is displayed in FIG. 4B. As the display of the reproducing mode, a reproducing icon 41 is displayed in an upper right portion on the screen. As the display of the fast-forward mode, a fast-forward icon 42 is displayed in the upper right portion on the screen. When such an OSD image is displayed, a user may grasp the content of an operation or setting.

The area active processing unit 4 determines optimum emission ratios of the LEDs 11a, 11b and 11c in accordance with peak values of the respective color components of each frame corresponding to each area 110 on the basis of the gradation values of image data input from the image processing unit 3 and a mix ratio described later input from the control unit 1. For example, in the case where the peak values of the red (R), green (G) and blue (B) components of one frame are respectively 10%, 60% and 30% of values employed in a dynamic range, the area active processing unit 4 sets the emission ratios of the respective LEDs 11a, 11b and 11c also to 10%, 60% and 30%. The area active processing unit 4 determines these emission ratios with respect to all the areas 110 for every frame.

Furthermore, the area active processing unit 4 determines, for every frame, a transmittance control value (voltage value) for controlling the transmittance of the display elements of the display panel unit 10 on the basis of the gradation values of the image data and the emission ratios determined as described above. The area active processing unit 4 outputs the determined emission ratios and the transmittance control value to the control unit 1 and the driving unit 5.

Incidentally, the quantity of light passing through the display elements of the display panel unit 10 is obtained by multiplying the emission ratio of the LED of the color corresponding to the display elements by the transmittance of the display elements. Since the emission ratios and the transmittance control value are determined on the basis of the gradation values of the image data, for example, when the gradation values of image data of a given portion of the display panel unit 10 is low, the power consumption of the backlight 11 may be reduced by lowering the emission ratios of the LEDs disposed in an area 110 corresponding to this portion.

The driving unit 5 includes a panel driving unit 51 and a backlight driving unit 52. The panel driving unit 51 corresponds to a driving circuit for the display panel unit 10 and performs control for changing the transmittance of the display elements of the display panel unit 10 in response to the transmittance control value input from the area active processing unit 4. The transmittance control value output from the panel driving unit 51 is charged in an electrode disposed in each display element of the display panel unit 10. Then, the inclination of liquid crystal molecules corresponding to the display elements is changed in accordance with the thus charged voltage, and as a result, the transmittance of the display elements is controlled. The backlight driving unit 52 corresponds to a driving circuit for the backlight 11, and performs control for changing the emission ratios of the LEDs 11a, 11b and 11c of the backlight 11 on the basis of the emission ratios input from the area active processing unit 4. It is noted that the backlight driving unit 52 controls the light emissions of the LEDs 11a, 11b and 11c with respect to each area 110.

The control unit 1 is a microcomputer including a CPU (central processing unit), a ROM (read only memory) and the like, and drives and controls the whole liquid crystal display device 20 by driving and controlling the respective components of the liquid crystal display device 20. For example, the control unit 1 detects, in the image processing unit 3, occurrence of a halo phenomenon (uneven luminance or uneven color) occurring in each area 110 on the basis of the transmittance control value (the voltage value), the emission ratios of the LEDs 11a, 11b and 11c and the like. When the halo phenomenon is detected, the control unit 1 changes the mix ratio described later for reducing the halo phenomenon. Thereafter, on the basis of the changed mix ratio, the control unit 1 determines the emission ratios of the LEDs 11a, 11b and 11c by the area active processing unit 4, so as to make mixed light of light from the LEDs 11a, 11b and 11c to be closer to white light.

Now, a method for detecting the occurrence of the halo phenomenon will be described.

Figure 14:
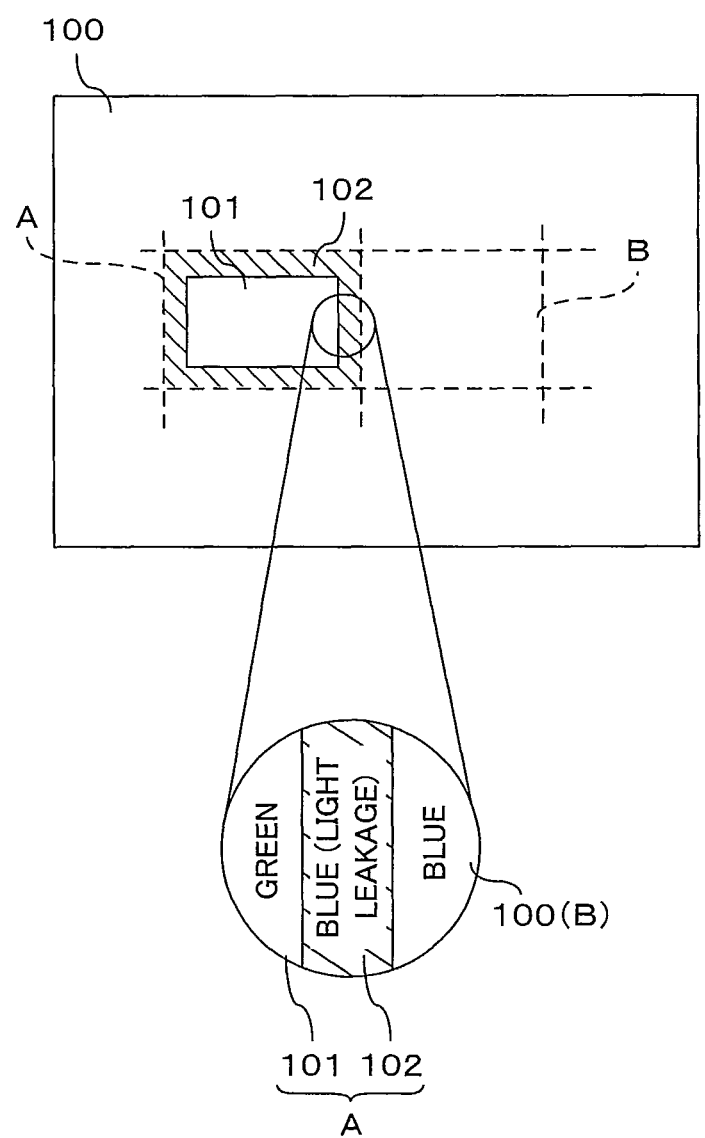
FIG. 14 is a schematic diagram explaining light leakage caused when emission ratios are changed.

The halo phenomenon means a phenomenon that a halo is dimly seen on and around the outline of an image due to light leakage from an LED through a color filter of a color not corresponding as described above. The control unit 1 detects the occurrence of the halo phenomenon on the basis of the balance in the emission ratios among the LEDs 11a, 11b and 11c and the balance in the transmittance of the display elements. It is assumed for specific explanation that the emission ratios of the LEDs 11a, 11b and 11c are respectively 0%, 80% and 20% in the area A of FIG. 14 and 0%, 0% and 20% in the area B and that the transmittance of the display elements is 100%. Furthermore, it is assumed that 10% of the light from the G-LED 11b leaks through the blue (B) filter and that the allowable range of the light leakage is less than 20% of light passing through the blue (B) filter. The allowable range of the light leakage means a limit of the quantity of light leakage that may spoil the image quality.

In this case, since the emission ratio of the G-LED 11b is 80%, the quantity of the light leakage is 8%. Also, since the emission ratio of the B-LED 11c is 20%, the allowable range of the light leakage is 4%. Since the quantity of the light leakage of the G-LED 11b is 8%, it is larger than the allowable range of the light leakage of the B-LED 11c. In other words, the light from the G-LED 11b is mixed in color with the light from the B-LED 11c in and around the border 102, and hence, a blue image in and around the border 102 is displayed in blue brighter than the original blue. Therefore, the image processing unit 3 calculates the quantity of the light leakage and detects the occurrence of the halo phenomenon when the calculated quantity is larger than the allowable range of the light leakage.

The image processing unit 3 executes the detection of the occurrence of the halo phenomenon with respect to each frame and each pixel of the display elements. Next, the image processing unit 3 executes the detection with respect to pixels vertically or horizontally adjacent to the pixel in which the occurrence of the halo phenomenon has been detected, so as to detect continuity of pixels where the halo phenomenon is detected. When the image processing unit 3 detects the occurrence of the halo phenomenon in a plurality of pixels vertically or horizontally adjacent to each other, namely, when pixels in which the halo phenomenon is detected occupy a prescribed area of one frame (for example, 50% of the whole area of the frame), it is determined that the halo phenomenon has occurred in the frame. Then, the control unit 1 determines to execute process of reducing the halo phenomenon on the basis of the continuity of frames where it is determined that the halo phenomenon has occurred, for example, when it is determined that the halo phenomenon has occurred in four continuous frames.

Incidentally, merely an example of the method for detecting the halo phenomenon is described in this embodiment, and the method for detecting the halo phenomenon, the conditions for determining the occurrence of the halo phenomenon and the like may be appropriately modified.

A method for reducing the halo phenomenon caused as mentioned above will now be described.

For reducing the halo phenomenon, the control unit 1 makes the mixed light of the light from the LEDs 11a, 11b and 11c to be closer to white light by additive color mixture. Specifically, since the emission ratios of LEDs of the respective colors are equal in white light, the area active processing unit 4 makes the emission ratios of the LEDs 11a, 11b and 11c equal to one another for making the mixed light to be closer to white light. In this embodiment, without controlling the emission ratio of one of the LEDs having the maximum emission ratio, the emission ratios of the other LEDs are controlled to be closer to the maximum emission ratio. When the emission ratio of, for example, the G-LED 11b is the maximum, the area active processing unit 4 makes the emission ratios of the R-LED 11a and the B-LED 11c to be closer to the emission ratio of the G-LED 11b.

The emission ratio of each LED determined by the area active processing unit 4 for reducing the halo phenomenon is determined on the basis of the mix ratio. The mix ratio is a ratio in changing the emission ratios of the LEDs 11a, 11b and 11c and is determined by the control unit 1. For example, when the emission ratios of the LEDs 11a, 11b and 11c are optimum for respective color components of image data, wherein the emission ratios are determined by the area active processing unit 4, the mix ratio is 0. In other words, when the mix ratio is 0, the emission ratios of the LEDs 11a, 11b and 11c are not changed. Alternatively, when the emission ratios of the LEDs 11a, 11b and 11c are changed to be equal to the maximum emission ratio, namely, when the backlight 11 is to be operated as a white light source, the mix ratio is 1.

The mix ratio may be determined in accordance with a prescribed function. Assuming that the respective emission ratios employed when the mix ratio is "0" are respectively r1, g1 and b1, that the emission ratios for operating as a white light source are respectively r2, g2 and b2, and that the mix ratio is m (wherein $0 \le m \le 1$), the emission ratios rm, gm, and bm determined in accordance with the mix ratio are calculated as follows:

$$rm = (r2 - r1) \times m + r1$$

$$gm = (g2 - g1) \times m + g1$$

$$bm = (b2 - b1) \times m + b1$$

Figure 5A:
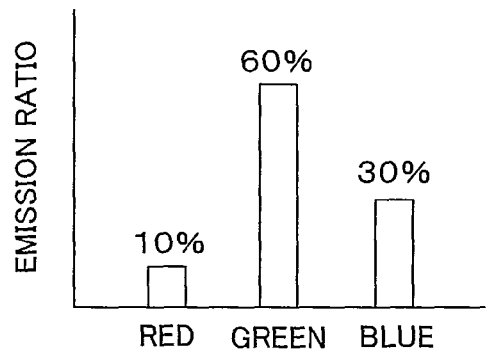
FIG. 5A is a schematic diagram illustrating the emission ratios of respective LEDs at one of various mix ratios, which is set to 0.
Figure 5B:
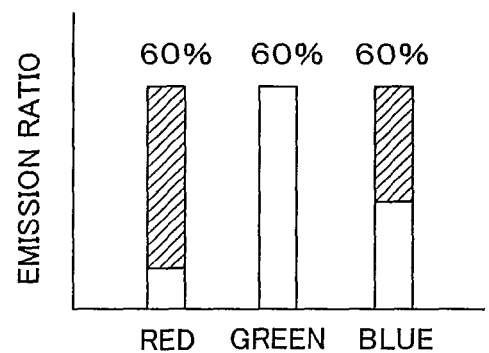
FIG. 5B is a schematic diagram illustrating the emission ratios of the respective LEDs at one of the various mix ratios, which is set to 1.
Figure 5C:
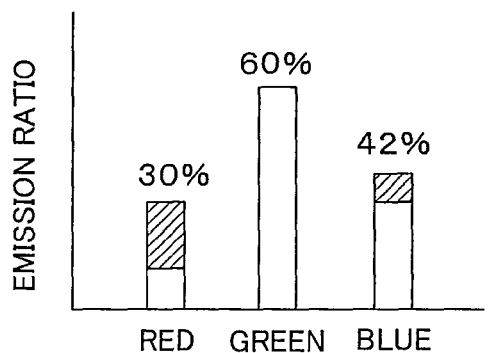
FIG. 5C is a schematic diagram illustrating the emission ratios of the respective LEDs at one of the various mix ratios, which is set to 0.4.

FIGS. 5A to 5C are schematic diagrams illustrating the emission ratios of the LEDs of the respective colors attained at different mix ratios. FIG. 5A illustrates the emission ratios attained when the mix ratio is 0, FIG. 5B illustrates the emission ratios attained when the mix ratio is 1, and FIG. 5C illustrates the emission ratios attained when the mix ratio is 0.4. When the mix ratio is 0, the emission ratios of the LEDs 11a, 11b and 11c are respectively 10%, 60% and 30% (see FIG. 5A). When the mix ratio is 1 (i.e., 100%), the emission ratios of the LEDs 11a, 11b and 11c are all 60% (see FIG. 5B). When the mix ratio is 0.4 (i.e., 40%), the emission ratios of the LEDs 11a, 11b and 11c are respectively 30%, 60% and 42% (see FIG. 5C).

When the control unit 1 determines the optimum mix ratio in accordance with the result of the detection by the image processing unit 3, the quantity of light leakage of the LED of one color may be lowered to be smaller than the allowable range of the quantity of light leakage of the LED of the other color, and hence, the halo phenomenon may be reduced. For example, in the aforementioned exemplary case of FIG. 14, the mix ratio is determined to be 33%.

Figure 6A:
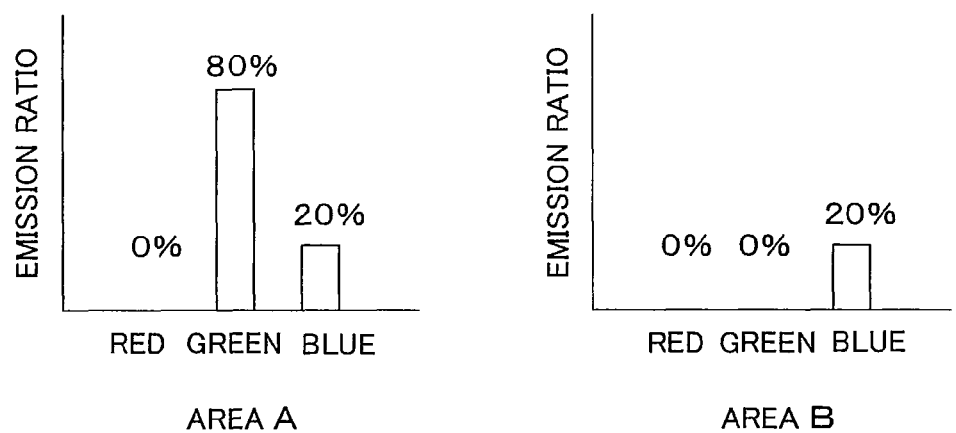
FIG. 6A is a schematic diagram illustrating the emission ratios of the LEDs attained before changing the emission ratios at a mix ratio of 33%.
Figure 6B:
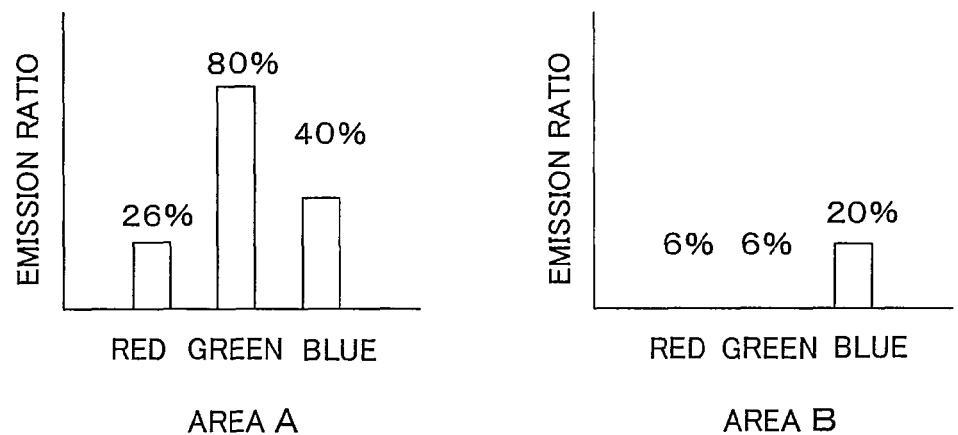
FIG. 6B is a schematic diagram illustrating the emission ratios of the LEDs attained after changing the emission ratios at a mix ratio of 33%.

FIGS. 6A and 6B are schematic diagrams illustrating the emission ratios attained in changing the emission ratios of the LEDs 11a, 11b and 11c at the mix ratio of 33%, and FIG. 6A illustrates the emission ratios attained before the change and FIG. 6B illustrates the emission ratios attained after the change. In the area A, the emission ratios of the LEDs 11a, 11b and 11c are respectively changed to 26%, 80% and 40%, and in the area B, the emission ratios are respectively changed to 6%, 6% and 20%. In this case, the quantity of the light leakage of the G-LED 11b with the emission ratio of 80% is 8%. Furthermore, the quantity of the light leakage of the B-LED 11c with the emission ratio of 40% is 4%, and the allowable range is twice as much as the quantity, namely, 8%. The quantity of light leakage of the G-LED 11b is 8%, which is not more than the allowable range of the quantity of the light leakage of the B-LED 11c. As a result, the halo phenomenon having occurred in and around the border 102 is reduced.

Incidentally, the control unit 1 may control, on the basis of the mix ratio, the light emission of the LEDs 11a, 11b and 11c included in merely an area 110 where the halo phenomenon has occurred or the LEDs 11a, 11b and 11c included in all the areas 110. When the light emission of the LEDs 11a, 11b and 11c included in merely the area 110 where the halo phenomenon has occurred is controlled, it is possible to prevent the color purity on the display screen from lowering in an area 110 where the halo phenomenon has not occurred, wherein the color purity is otherwise lowered by controlling the light emission of the LEDs 11a, 11b and 11c disposed in such an area. Furthermore, the power consumption of the backlight 11 may be lowered since the emission ratios are suppressed to be low. On the other hand, when the light emission of the LEDs 11a, 11b and 11c disposed in all the areas 110 is controlled, the color purity on the whole screen may be made uniform, and in addition, since the process may be simply performed, the circuit scale may be downsized.

Moreover, when the mix ratio is to be changed, the control unit 1 may change the light emission of the LEDs 11a, 11b and 11c to be closer to the white light continuously or in a stepwise manner. For example, when the light emission is continuously changed, the color purity may be smoothly changed. Alternatively, when the emission is changed in a stepwise manner at timing unnoticed by a viewer, the color purity may be changed without making a viewer feel uncomfortable. Furthermore, the control unit 1 may appropriately change the speed for making the light closer to the white light. For example, a viewer is not bothered by the halo phenomenon in some cases depending upon the position or the size of the halo phenomenon. In such cases, it is possible to make the viewer unconscious of the change of the color of an image displayed in the display panel unit 10 by slowly making the light closer to the white light. Alternatively, when the halo phenomenon is eliminated by making the light to be closer to the white light more quickly, an image with the image quality not spoiled may be displayed.

The control unit 1 sets, on the basis of an OSD image, an area where the occurrence of the halo phenomenon is to be detected (hereinafter referred to as the detection area) and an area where it is not to be detected (hereinafter referred to as the non-detection area). There is a case that an OSD image is displayed in a screen edge portion in a short period of time as the channel number 30 of FIG. 3A. In this case, the halo phenomenon derived from the OSD image disappears in a short period of time, and hence, a viewer may not be bothered by the occurrence of the halo phenomenon. In such a case, the original image quality of a displayed image may be degraded by changing the emission ratios of the LEDs 11a, 11b and 11c for reducing the halo phenomenon, resulting in making a viewer feel more uncomfortable than the halo phenomenon derived from the OSD image in some cases. Therefore, when an OSD image is displayed in a short period of time or in a screen edge portion, the control unit 1 sets an area of and around the OSD image as the non-detection area and sets the remaining area as the detection area.

It is noted that the control unit 1 sets the detection area and the non-detection area in accordance with the areas 110 of the backlight 11. The screen of the display panel unit 10 is divided into a plurality of areas in the same manner as the areas 110, and each of the divided area is set as the detection area or the non-detection area. Since the light emission of the backlight 11 is controlled with respect to each area 110, when one area 110 corresponds to the non-detection area, there is no need to control the light emission of the LEDs included in this area 110, and hence, the power consumption of the backlight 11 may be reduced.

Figure 7:
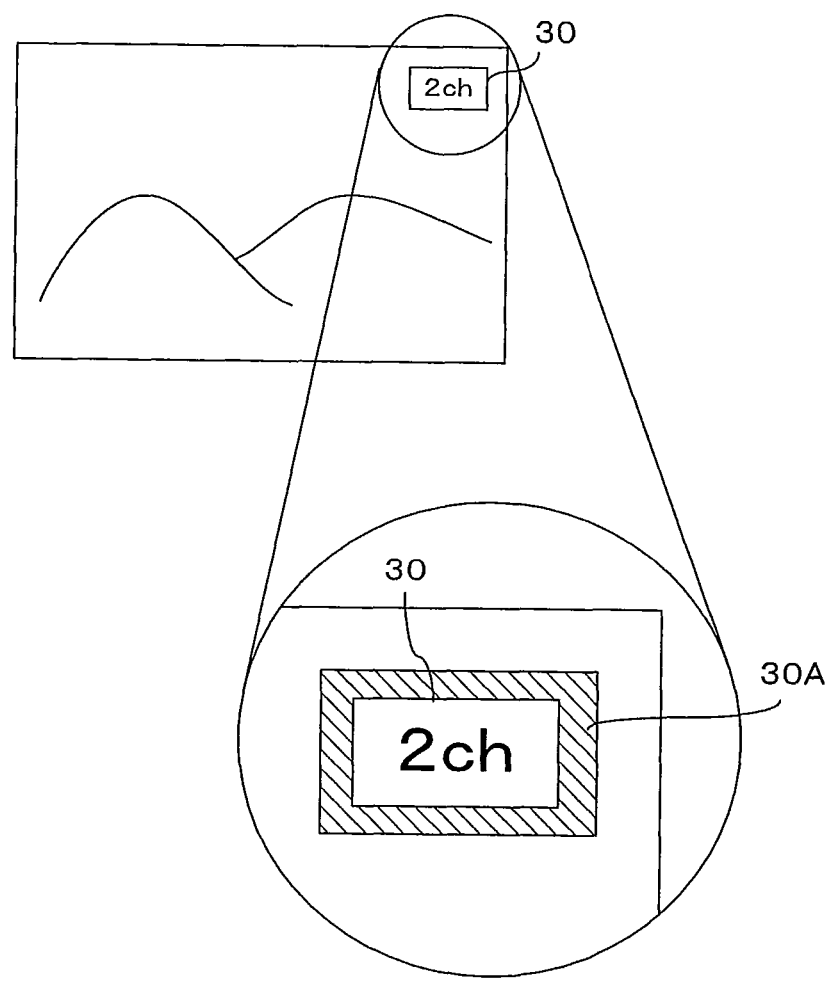
FIG. 7 is a schematic diagram explaining a detection area to be set in displaying an OSD image.

FIGS. 7 and 8 are schematic diagrams explaining the detection area to be set in displaying an OSD image. In FIG. 7, the channel number 30 is displayed in an upper right portion of the screen. The control unit 1 sets an area 30A corresponding to and surrounding the channel number 30 as the non-detection area and sets the remaining area as the detection area. In this case, even when the halo phenomenon occurs due to the display of the channel number 30, the process of reducing the halo phenomenon is not performed. In FIG. 8, the reproducing icon 41 is displayed in the upper right portion of the screen. The control unit 1 sets an area 41A corresponding to and surrounding the reproducing icon 41 as the non-detection area and sets the remaining area as the detection area. Incidentally, although the area 41A is in a rectangular shape in FIG. 8, it may be in a circular shape similarly to the reproducing icon 41. When any of the OSD images of FIGS. 3A to 3D, 4A and 4B is displayed, the control unit 1 similarly sets an area corresponding to and surrounding the OSD image as the non-detection area and sets the remaining area as the detection area.

Figure 9:
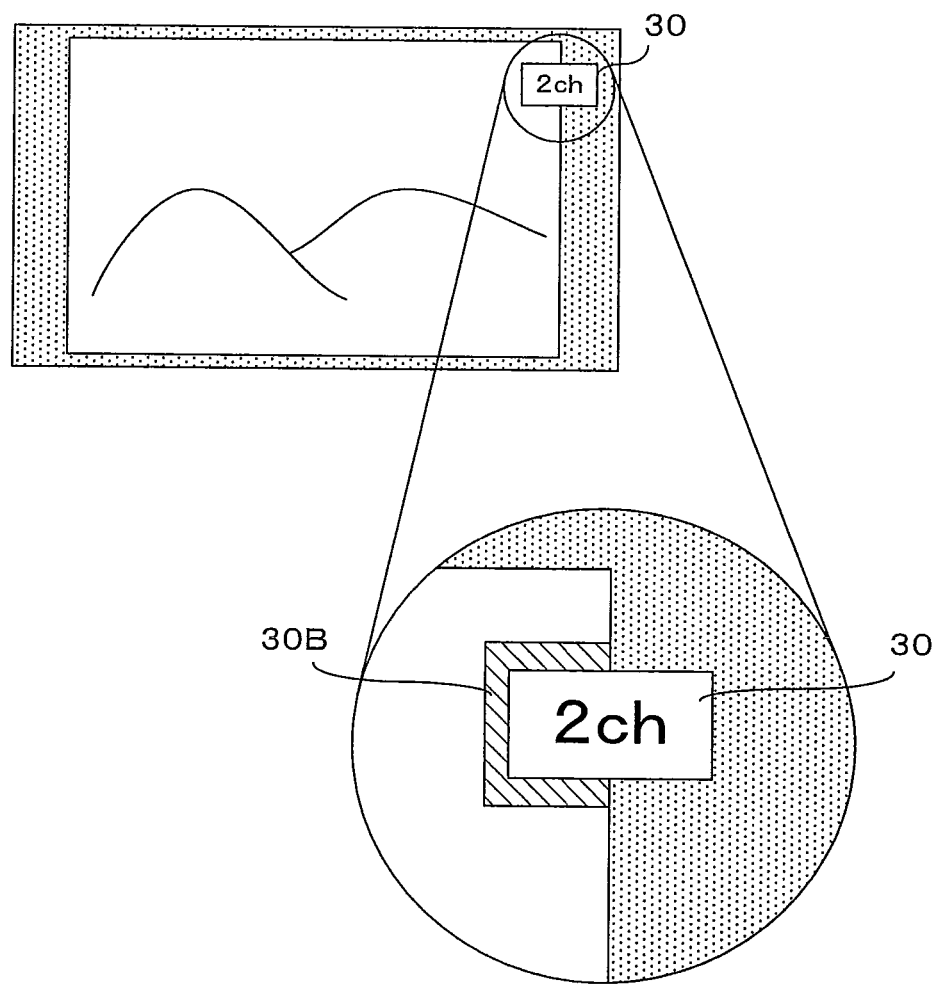
FIG. 9 is a schematic diagram explaining a detection area to be set in displaying an OSD image in a case where an image is not displayed in the whole screen.

FIG. 9 is a schematic diagram explaining the detection area to be set in displaying an OSD image in a case where an image is not displayed in the whole screen. The case where an image is not displayed in the whole screen corresponds to a case where, for example, belt-shaped black images are displayed at both ends of the screen in changing the aspect ratio of the screen. In this case, when an OSD image (that is, the channel number 30 in FIG. 9) is displayed to partly overlap the black image, the control unit 1 sets an area 30B corresponding to and surrounding a portion of the channel number 30 not overlapping the black image as the non-detection area and sets the remaining area as the detection area. It is noted that a portion corresponding to the black image is set as the non-detection area because the halo phenomenon never occurs in this portion.

Figure 10:
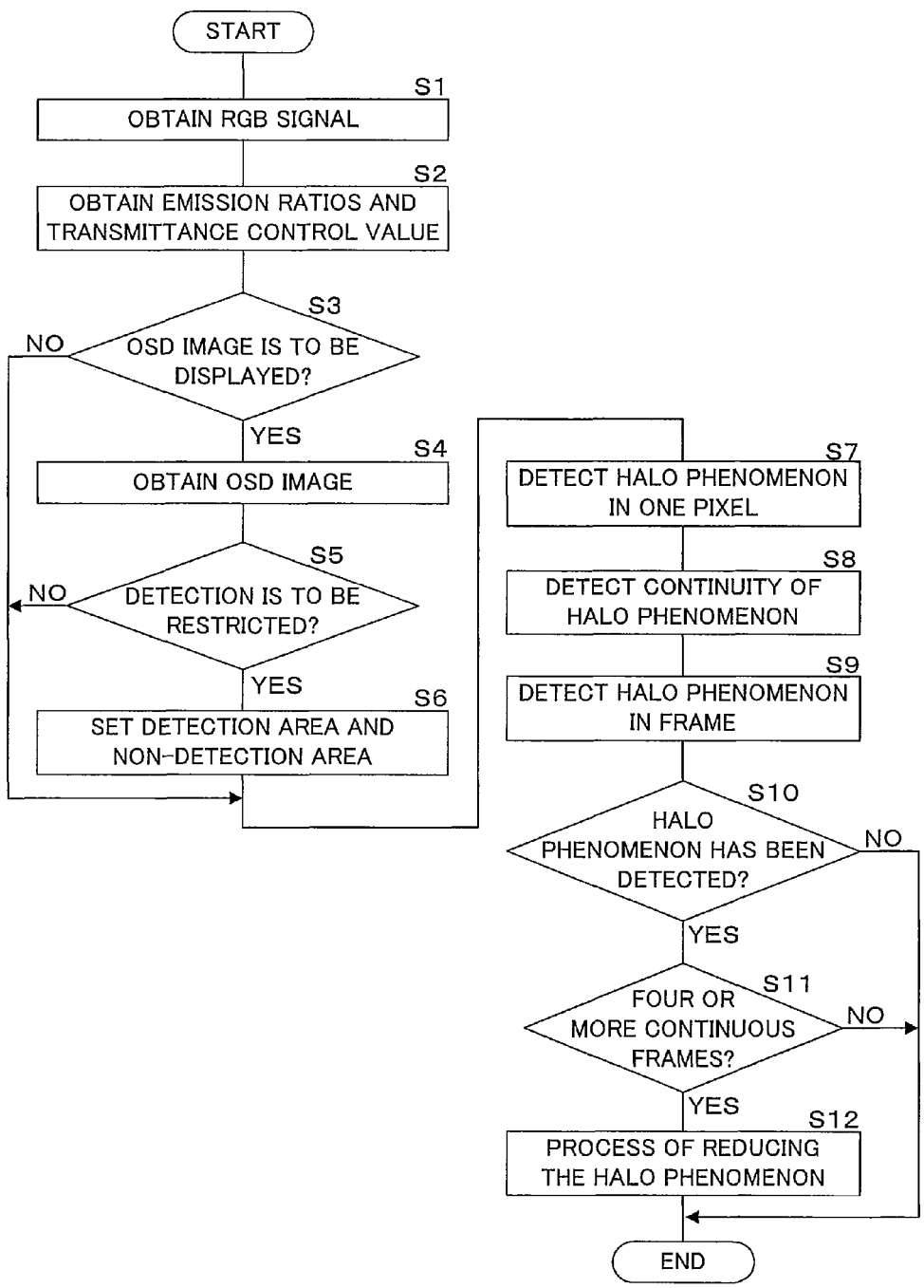
FIG. 10 is a flowchart illustrating process to be executed in the liquid crystal display device.

The operation performed in displaying an RGB video signal on the screen of the liquid crystal display device 20 having the aforementioned structure will now be described. FIG. 10 is a flowchart illustrating process to be executed in the liquid crystal display device 20.

The image processing unit 3 obtains an RGB video signal from the reproducing device 12 through the receiving unit 2 (S1) and obtains the emission ratios and the transmittance control value for one frame of the RGB video signal (S2). The emission ratios and the transmittance control value are determined by the area active processing unit 4 or estimated by the image processing unit 3.

Next, the control unit 1 determines whether or not an OSD image is to be displayed (S3). When an OSD image is not to be displayed (i.e., NO in S3), the process proceeds to S7. When an OSD image is to be displayed (i.e., YES in S3), the control unit 1 obtains the content of the OSD image to be displayed (S4). Thereafter, the control unit 1 determines, on the basis of the content of the OSD image, whether or not the detection of the occurrence of the halo phenomenon is to be restricted (S5).

When the detection of the occurrence of the halo phenomenon is to be restricted (i.e., YES in S5), the control unit 1 sets the detection area and the non-detection area (S6). Specifically, the control unit 1 sets an area corresponding to and surrounding the OSD image as the non-detection area and sets the remaining area as the detection area as described with reference to FIGS. 7 to 9. Thus, even when the halo phenomenon occurs in and around the OSD image, the image processing unit 3 does not control the light emission in this area, and hence, the original image quality is not degraded. Subsequently, the process proceeds to S7. On the other hand, when the detection of the occurrence of the halo phenomenon is not to be restricted (i.e., NO in S5), the process proceeds to S7 without setting the detection area and the non-detection area by the control unit 1. In this case, the control unit 1 sets the whole screen as the detection area.

Next, the control unit 1 detects the occurrence of the halo phenomenon in one pixel of the display elements (S7) and detects continuity of pixels where the occurrence of the halo phenomenon is detected (S8). On the basis of the result of this detection, the control unit 1 detects the occurrence of the halo phenomenon in the current frame (S9). Specifically, the control unit 1 calculates the light leakage of the LEDs and detects the occurrence of the halo phenomenon on the basis of the calculation result as described above.

The control unit 1 determines, on the basis of the detection result obtained in S9, whether or not the occurrence of the halo phenomenon has been detected in the current frame (S10). When the occurrence of the halo phenomenon has not been detected (i.e., NO in S10), the process is terminated. In other words, the control unit 1 terminates the process for the current frame and executes the same process on a next frame. When the occurrence of the halo phenomenon has been detected (i.e., YES in S10), the control unit 1 determines whether or not the occurrence of the halo phenomenon has been detected over four or more continuous frames (S11). When the occurrence has not been detected in continuous frames (i.e., NO in S11), the process is terminated. In other words, the control unit 1 terminates the process for the current frame and executes the same process on a next frame.

When the occurrence has been detected over four or more continuous frames (i.e., YES in S11), the control unit 1 executes the process of reducing the halo phenomenon (S12). Specifically, the control unit 1 determines an optimum mix ratio and reduces the quantity of light leakage of the LED of one color to be not more than the allowable ranges of the light leakages of the other LEDs of the other colors, so as to reduce the halo phenomenon. In this case, the control unit 1 may control the LEDs 11a, 11b and 11c disposed merely in the area 110 where the halo phenomenon has occurred or may control the LEDs 11a, 11b and 11c disposed in all the areas 110. Thereafter, the process is completed.

Incidentally, when the halo phenomenon is not detected any more while the control unit 1 is performing the control for changing the mix ratio of the LEDs 11a, 11b and 11c, the control for changing the mix ratio of the LEDs is terminated. In other words, the control unit 1 performs control for making the light from the LEDs 11a, 11b and 11c, which has been made to be closer to the white light, to be away from the white light.

As described so far, in the liquid crystal display device 20 according to this embodiment, an area corresponding to and surrounding an OSD image is set as a non-detection area so as not to detect the halo phenomenon therein. As a result, even when the halo phenomenon occurs due to the OSD image, the process of reducing the halo phenomenon is not performed, and hence, the original image quality is never degraded. Accordingly, it is possible to suppress a fear of degradation of the original image quality otherwise caused by preferentially performing the process of reducing the halo phenomenon that may disappear in a short period of time.

Furthermore, in the liquid crystal display device according to this embodiment, the occurrence of the halo phenomenon is detected in every frame of an RGB video signal, and when the halo phenomenon occurs over continuous frames, the light emitted from the LEDs 11a, 11b and 11c is made to be closer to the white light. Therefore, the quantity of the light leakage of the light from the backlight 11 may be reduced. As a result, it is possible to reduce a fear of spoiling the quality of an image to be displayed in the display panel unit 10 due to transmission of unwanted light from the backlight 11.

Incidentally, although the process of reducing the halo phenomenon is performed in this embodiment when there is a possibility of occurrence of the halo phenomenon in four continuous frames, the number of continuous frames may be appropriately changed. For example, the number of continuous frames may be determined depending upon a time interval of extracting frames. Furthermore, as described above, the LEDs 11a, 11b and 11c disposed in merely an area 110 where the halo phenomenon has occurred may be controlled or the LEDs 11a, 11b and 11c disposed in all the areas 110 may be controlled.

Embodiment 2

Next, Embodiment 2 according to the present invention will be described merely with respect to a difference from Embodiment 1.

In this embodiment, the non-detection area is not set but a first detection area where the occurrence of the halo phenomenon is to be detected and a second detection area where the level for detecting the occurrence of the halo phenomenon is lower than in the first detection area are set on the basis of the content of an image to be displayed. The level of the detection is determined in accordance with the above-described allowable range of the light leakage in detecting the occurrence of the halo phenomenon. Since the occurrence of the halo phenomenon is detected when the quantity of the light leakage is larger than the allowable range, as the allowable range is larger, the occurrence of the halo phenomenon is more difficult to detect. Accordingly, the level of the detection is lower as the allowable range is larger, and therefore, the allowable range is set to be larger in the second detection area 43 than in the first detection area 40.

The control unit 1 of the liquid crystal display device 20 according to this embodiment obtains genre information. Images to be displayed in the display panel unit 10 on the basis of RGB video signals are classified into a plurality of genres such as a drama, a movie and news. The genre information is received by the receiving unit 2 together with an RGB video signal from the reproducing device 12. Incidentally, in the case where the receiving unit 2 receives television broadcast, the control unit 1 may obtain the genre information from an EPG (electric program guide) or may obtain genre information set by a viewer.

The control unit 1 sets the first and second detection areas on the basis of the obtained genre information. FIGS. 11A and 11B are schematic diagrams illustrating first and second detection areas set on the basis of the genre information. Specifically, FIG. 11A illustrates the first and second detection areas set in the case of a foreign movie frequently using subtitles, a news program or a variety show. The second detection area 43 is set in a lower portion of the screen where subtitles are highly probably displayed. The first detection area 40 is set in an area other than the portion where the second detection area 43 is set.

FIG. 11B illustrates the first and second detection areas set in the case of, for example, a drama. In displaying a drama, the gaze of a viewer is occasionally attracted to the center of the screen, and since it is necessary to reduce the halo phenomenon occurring in this area, the first detection area 40 is set in the center portion of the screen. On the other hand, even when the halo phenomenon occurs in an edge portion of the screen, there is a high possibility that the viewer is not bothered by this halo phenomenon, and therefore, the second detection area 43 is set as a portion surrounding the first detection area 40.

In this manner, when the level for detecting the occurrence of the halo phenomenon is set to be higher in a portion attracting the gaze of a viewer while the level is set to be lower in the other portion, it is possible to suppress increase of the power consumption of the backlight 11 otherwise caused by excessively performing the process of reducing the halo phenomenon.

Figure 12:
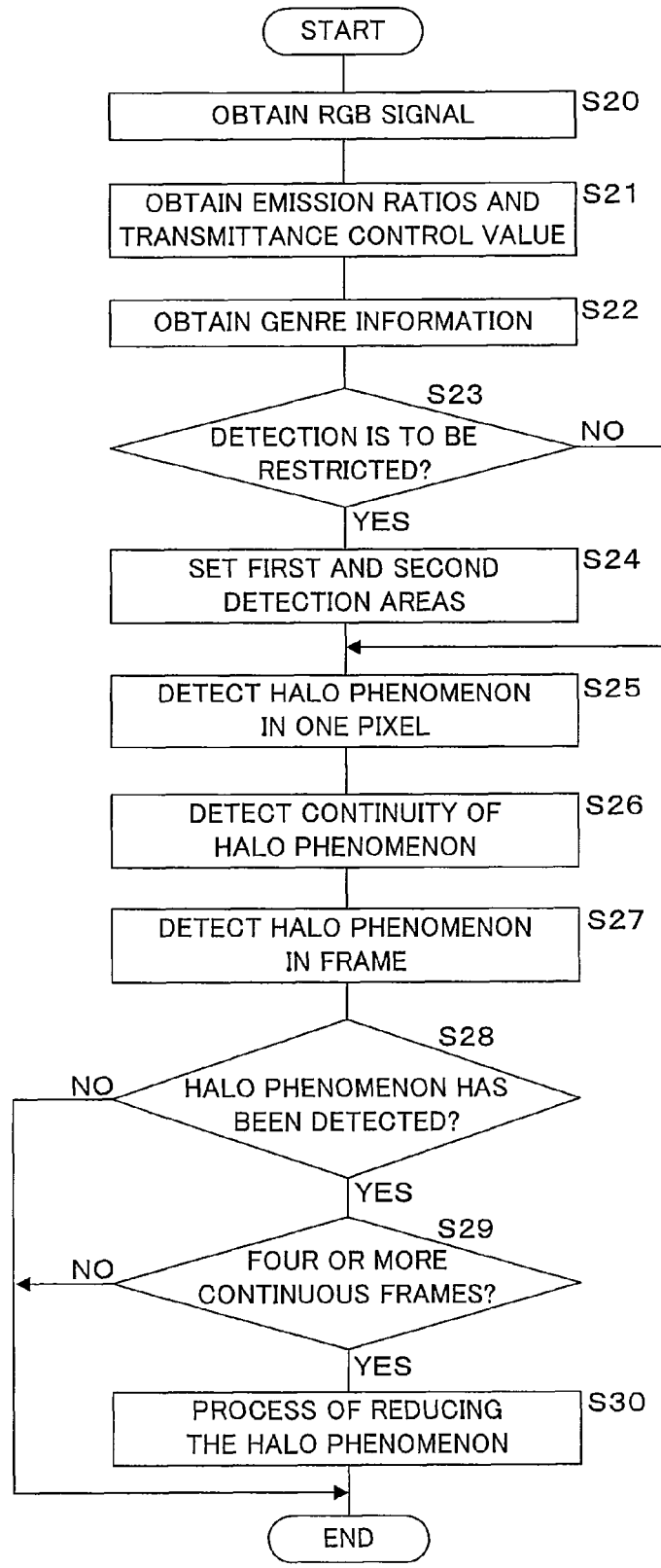
FIG. 12 is a flowchart illustrating process to be executed in the liquid crystal display device.
Figure 13:
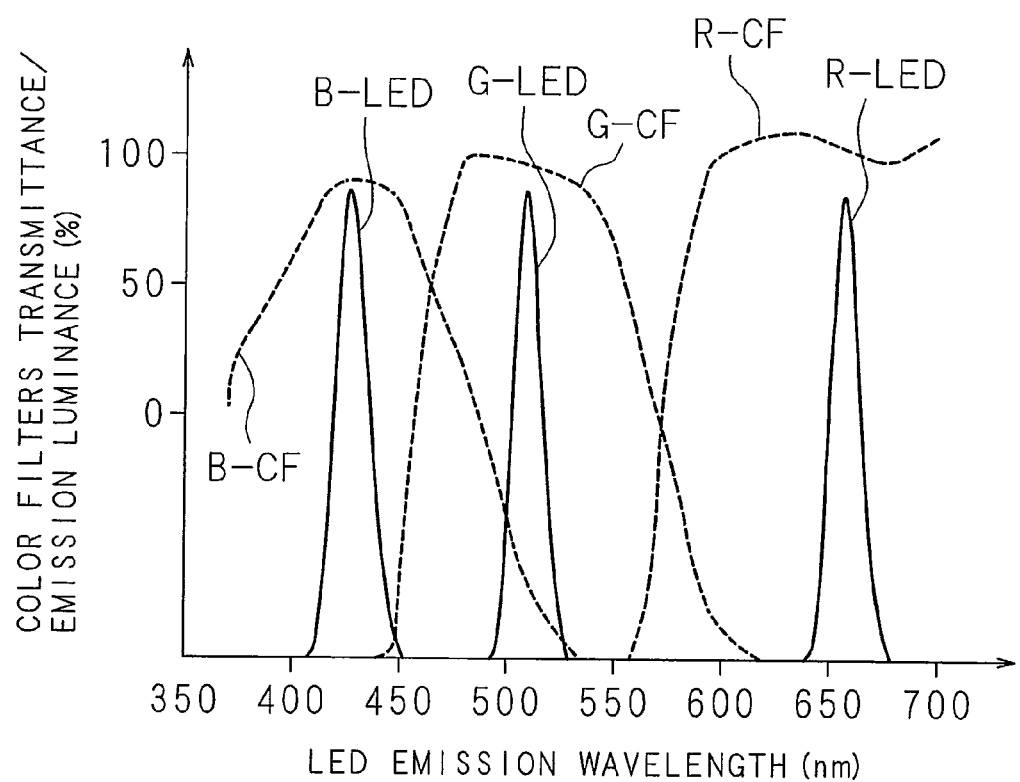
FIG. 13 is a schematic diagram illustrating the relationship between transmittance characteristics of color filters of a liquid crystal panel and the wavelengths of the respective RGB LEDs.

An operation for displaying an RGB video signal on the screen performed by the liquid crystal display device 20 according to this embodiment will now be described. FIG. 12 is a flowchart illustrating process to be executed in the liquid crystal display device 20.

The image processing unit 3 obtains an RGB video signal through the receiving unit 2 from the reproducing device 12 (S20), and obtains the emission ratios and the transmittance control value for one frame of the RGB video signal (S21). The emission ratios and the transmittance control value are determined by the area active processing unit 4 or estimated by the image processing unit 3.

Next, the control unit 1 obtains the genre information (S22). The genre information may be obtained from the EPG or may be set by a viewer. The control unit 1 determines, on the basis of the obtained genre information, whether or not the detection of the occurrence of the halo phenomenon is to be restricted (S23). When the detection of the occurrence of the halo phenomenon is to be restricted (i.e., YES in S23), the control unit 1 sets the first detection area and the second detection area (S24). Specifically, as described with reference to FIGS. 11A and 11B, the control unit 1 sets the lower portion of the screen where there is a high possibility of displaying subtitles or an edge portion of the screen as the second detection area 43 and sets the remaining portion as the first detection area 40. Thereafter, the process proceeds to S25. On the other hand, when the detection of the occurrence of the halo phenomenon is not to be restricted (i.e., NO in S23), the process proceeds to S25 without setting the first and second detection areas by the control unit 1. In this case, the control unit 1 sets the level for the detection to be equal over the screen. Incidentally, since procedures performed after S25 are the same as those performed after S7 of FIG. 10, the description is herein omitted.

As described so far, in this embodiment, the level for the detection is lowered, on the basis of the content of an image to be displayed, in a portion where a viewer is not bothered by the occurrence of the halo phenomenon. Therefore, the process for reducing the halo phenomenon occurring in a portion where it does not bother a viewer is not performed, and hence, the original image quality is not degraded. Accordingly, it is possible to suppress a fear of degradation of the original image quality otherwise caused by preferentially performing the process of reducing the halo phenomenon not bothering.

The present invention has been specifically described so far, and the invention is not limited to these embodiments but the structure, the operation and the like may be appropriately modified.

As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image display device for displaying an image that includes a plurality of frames in a display panel that includes color filters of a plurality of colors by respectively controlling emission ratios of a plurality of light sources that emit light of colors respectively corresponding to the color filters, comprising:
    a detecting unit that detects, for the respective frames of the image, halo phenomenon caused in the display panel due to a light leakage from the light source of the color other than the color corresponding to the color filter;
    a detection restricting unit that restricts detection performed by the detecting unit to detection of the halo phenomenon in a part of the display panel; and
    a control unit that controls the emission ratios of the light sources and makes color of the light to be closer to white by lowering chroma of the light, wherein the light corresponds to mixed light from the plurality of light sources and to be made incident upon the color filters, when the detecting unit detects the halo phenomenon in a plurality of continuous frames.

2. The image display device according to claim 1, wherein the control unit controls the emission ratios of the light sources for making color of the light from the light sources to be closer to white by lowering the chroma of the light by additive color mixture.

3. The image display device according to claim 1, wherein the detection restricting unit comprises:
    a type obtaining unit that obtains a type of an image to be displayed in the display panel; and
    a setting unit that sets an arbitrary area in the display panel on the basis of the type obtained by the type obtaining unit, and
    the detection restricting unit restricts detection performed by the detecting unit in the area set by the setting unit.

4. The image display device according to claim 2, wherein the detection restricting unit comprises:
    a type obtaining unit that obtains a type of an image to be displayed in the display panel; and
    a setting unit that sets an arbitrary area in the display panel on the basis of the type obtained by the type obtaining unit, and
    the detection restricting unit restricts detection performed by the detecting unit in the area set by the setting unit.

5. The image display device according to claim 1, wherein the detecting unit detects halo phenomenon occurring in a part of the display panel, and
    the control unit controls the emission ratios of the light sources disposed in a position corresponding to the part detected by the detecting unit.

6. The image display device according to claim 2, wherein the detecting unit detects halo phenomenon occurring in a part of the display panel, and the control unit controls the emission ratios of the light sources disposed in a position corresponding to the part detected by the detecting unit.

7. The image display device according to claim 1, further comprises a display control unit that displays an On Screen Display (OSD) image in the display panel,
wherein the detection restricting unit restricts detection on the basis of the OSD image displayed by the display control unit.

8. The image display device according to claim 2, further comprises a display control unit that displays an On Screen Display (OSD) image in the display panel,
wherein the detection restricting unit restricts detection on the basis of the OSD image displayed by the display control unit.

9. The image display device according to claim 3, further comprises a display control unit that displays an On Screen Display (OSD) image in the display panel,
wherein the detection restricting unit restricts detection on the basis of the OSD image displayed by the display control unit.

10. The image display device according to claim 5, further comprises a display control unit that displays an On Screen Display (OSD) image in the display panel,
wherein the detection restricting unit restricts detection on the basis of the OSD image displayed by the display control unit.

11. The image display device according to claim 7,
wherein the detection restricting unit restricts detection in a position corresponding to the OSD image displayed by the display control unit in the display panel.

12. The image display device according to claim 8,
wherein the detection restricting unit restricts detection in a position corresponding to the OSD image displayed by the display control unit in the display panel.

13. The image display device according to claim 9,
wherein the detection restricting unit restricts detection in a position corresponding to the OSD image displayed by the display control unit in the display panel.

14. The image display device according to claim 10,
wherein the detection restricting unit restricts detection in a position corresponding to the OSD image displayed by the display control unit in the display panel.

15. The image display device according to claim 7, further comprises a receiving unit that receives a signal from external device,
wherein the display control unit displays the OSD image on the basis of the signal received by the receiving unit.

16. The image display device according to claim 8, further comprises a receiving unit that receives a signal from external device,
wherein the display control unit displays the OSD image on the basis of the signal received by the receiving unit.

17. The image display device according to claim 9, further comprises a receiving unit that receives a signal from external device,
wherein the display control unit displays the OSD image on the basis of the signal received by the receiving unit.

18. The image display device according to claim 10, further comprises a receiving unit that receives a signal from external device,
wherein the display control unit displays the OSD image on the basis of the signal received by the receiving unit.

19. An image display method for displaying an image that includes a plurality of frames in a display panel that includes color filters of a plurality of colors by respectively controlling emission ratios of a plurality of light sources that emit light of colors respectively corresponding to the color filters, comprising the steps of:
detecting, for the respective frames of the image, halo phenomenon caused in the display panel due to a light leakage from the light source of the color other than the color corresponding to the color filter with the detection restricted to detection of the halo phenomenon in a part of the display panel; and
controlling the emission ratios of the light sources and making color of the light to be closer to white by lowering chroma of the light, wherein the light corresponds to mixed light from the plurality of light sources and to be made incident upon the color filters, when it is detected the halo phenomenon in a plurality of continuous frames.

* * * * *